United States Patent
Bergström et al.

(10) Patent No.: US 12,382,527 B2
(45) Date of Patent: Aug. 5, 2025

(54) CELL ID SELECTION IN MULTI CELL ID SCENARIOS

(71) Applicant: TELEFONAKTIEBOLAGET LM ERICSSON (PUBL), Stockholm (SE)

(72) Inventors: Mattias Bergström, Sollentuna (SE); Magnus Stattin, Upplands Väsby (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 261 days.

(21) Appl. No.: 17/054,162

(22) PCT Filed: May 9, 2019

(86) PCT No.: PCT/IB2019/053850
§ 371 (c)(1),
(2) Date: Nov. 9, 2020

(87) PCT Pub. No.: WO2019/215680
PCT Pub. Date: Nov. 14, 2019

(65) Prior Publication Data
US 2024/0260113 A1   Aug. 1, 2024

Related U.S. Application Data

(60) Provisional application No. 62/669,166, filed on May 9, 2018.

(51) Int. Cl.
H04W 76/19 (2018.01)
H04W 48/10 (2009.01)
H04W 48/16 (2009.01)

(52) U.S. Cl.
CPC ......... *H04W 76/19* (2018.02); *H04W 48/10* (2013.01); *H04W 48/16* (2013.01)

(58) Field of Classification Search
CPC ............................. H04W 76/19; H04W 48/10
See application file for complete search history.

(56) References Cited

U.S. PATENT DOCUMENTS

| | | | |
|---|---|---|---|
| 9,220,055 B2* | 12/2015 | Shin | H04W 48/16 |
| 9,924,498 B2* | 3/2018 | Chen | H04W 48/20 |
| 2013/0017834 A1 | 1/2013 | Han | |
| 2013/0083753 A1* | 4/2013 | Lee | H04W 72/0453 370/329 |

(Continued)

FOREIGN PATENT DOCUMENTS

| | | |
|---|---|---|
| JP | 2013533699 A | 8/2013 |
| WO | 2017124434 A1 | 1/2016 |

OTHER PUBLICATIONS

CR on Connection Control ([101 #37][NR] RRC procedures/messages) Change Request 38.331 V 15.1.0, 3GPP TSG-RAN WG2 #101Bis, Sanya, P.R. of China, Apr. 16-20, 2018.

(Continued)

*Primary Examiner* — Rasheed Gidado
(74) *Attorney, Agent, or Firm* — Frost Brown Todd LLP

(57) ABSTRACT

A method performed by a wireless device for cell identifier (Cell-ID) selection, includes attempting a radio resource control (RRC) connection action. A designated Cell-ID is selected from a plurality of Cell IDs in a system information block (SIB). An identifier is determined based on the designated Cell-ID. The identifier is transmitted to a network node as part of the RRC connection action.

24 Claims, 13 Drawing Sheets

(56) References Cited

U.S. PATENT DOCUMENTS

| | | | | |
|---|---|---|---|---|
| 2013/0303081 | A1* | 11/2013 | Chang | H04W 36/0061 |
| | | | | 455/524 |
| 2013/0336296 | A1* | 12/2013 | Dinan | H04L 5/001 |
| | | | | 370/336 |
| 2013/0343297 | A1* | 12/2013 | Dinan | H04W 56/0045 |
| | | | | 370/329 |
| 2015/0304891 | A1* | 10/2015 | Dinan | H04W 72/21 |
| | | | | 370/331 |
| 2016/0021483 | A1* | 1/2016 | Wei | H04W 4/70 |
| | | | | 455/41.2 |
| 2016/0255512 | A1* | 9/2016 | Huang | H04W 16/02 |
| | | | | 455/449 |

OTHER PUBLICATIONS

Ericsson, "Clause 6.8.2.1 (key handling—RRC Inactive/Connected state transition)", S3-180752 (revision of S3-180272). 3GPP TSG-SA WG3 Meeting #90Bis, San Diego (US), Feb. 26-Mar. 2, 2018.

Huawei, et al.: "Clarification on PLMN selection in network sharing scenario". 3GPP TSG-SA WG2 Meeting #126. S2-182004. Montreal, Canada, Feb. 26-Mar. 2.

Rapporteur (Samsung), "Miscellaneous corrections from review in preparation for ASN.1 freeze (online0)", 3GPP TSG RAN #79 RP-180491, Internet URL: https://www.3gpp.org/ftp/tsg_ran/TSG_RAN/TSGR_79/Docs/RP-180491.zip, Mar. 17. 2018.

Samsung, "UE context fetch (online)", 3GPP TSG-RAN WG3#83 R3-140140, internet URL: http://www.3gpp.org/ftp/tsg_ran/WG3_lu/TSGR3_83/Docs/R3-140140.zip, Jan. 31, 2014.

\* cited by examiner

CELL ID SELECTION IN MULTI CELL ID SCENARIOS

This application is a 371 of International Application No. PCT/IB2019/053850, filed May 9, 2019, which claims the benefit of U.S. Application No. 62/669,166, filed May 9, 2018, the disclosures of which are fully incorporated herein by reference.

BACKGROUND

In pre-Rel-14, SIB1 had the following information: one Cell identity; one Tracking Area Code (TAC); and one list of Public Land Mobile Network (PLMN) identity. For example the eNB may send: Cell ID: 1; TAC: M; and PLMN A, PLMN B, PLMN C, PLMN D, PLMN E.

With this signalling all PLMN A-PLMN E were associated with the same Cell ID (1 in the above example) and the same TAC (M in the above example). If different operators were associated with the different PLMNs, that would then require the operators to agree on which Cell ID and which TAC to use, thus creating a need for them to coordinate, which may not be desirable in all scenarios.

In LTE Rel-14, an enhancement was introduced. With this enhancement, the different PLMNs (which may be associated with different operators) could be associated with different Cell IDs/TACs. For example, with this enhancement, it would be possible that PLMN A and PLMN B use one cell ID and TAC, while PLMN C could use another cell ID and TAC, and PLMN D and PLMN E could use a third cell ID and TAC. With the enhancement, a new list was added where each entry in the list contains one Cell ID, one TAC and one list of PLMNs. Hence allowing the eNB to signal for example:
Legacy Fields:
  Cell ID: 1
  TAC: M
  PLMN A, PLMN B
New List:
List Entry 1:
  Cell ID: 2
  TAC: N
  PLMN C
List Entry 2:
  Cell ID: 3
  TAC: O
  PLMN D, PLMN E A UE would select a PLMN and then consider the cell ID and TAC to be those associated with that PLMN. For example, in the above if the UE selects PLMN A it would consider the Cell ID to be 1, and the TAC to be M, while if the UE selects PLMN C it would consider the Cell ID to be 2 and the TAC to be N.

The enhancement described above is to be implemented in NR specifications as well, however in the NR specifications there is only one list where each entry in the list contain a PLMN-lists, a cell ID and a TAC, and hence there is no "legacy fields" as described above.

In LTE, if the UE's link to the network becomes poor, the UE triggers a Radio Link Failure (RLF) procedure. The link can be considered poor, for example, if the perceived downlink quality is lower than a threshold, a random access-procedure is unsuccessful, and the number of RLC retransmissions exceeds/meets a threshold. When RLF is triggered, the UE would (given certain conditions) attempt to reestablish the connection to the network. The UE also attempts to reestablish the connection to the network if for example a handover fails, etc.

When the UE attempts to reestablish the connection to the network, the UE sends a re-establishment request including the following information to the eNB which the UE attempts to reestablish the connection towards (note that it may be another cell/eNB compared to the cell/eNB where the connection failed):
  A C-RNTI value used during the previous connection.
  A Physical Cell ID (PCI) of the cell which the UE was connected to during the previous connection
  A shortMAC-I value which is used to identify and verify the UE at RRC connection re-establishment
  An indication of the cause of the reestablishment, e.g. handover failure, etc.

The eNB which serves the cell which receives this request is sometimes referred to as the target eNB, while the eNB which the UE was connected to before the failure is sometimes referred to as the source eNB. The target eNB would, based on the information provided by the UE, attempt to re-establish the connection. The target eNB can do this by determining which eNB is the source eNB (considering the PCI) and requesting that eNB to send the UE's context. In the request, the target provides, among other things, the following information:
  Cell ID of the target cell
  C-RNTI is an identifier the UE had in the source cell
  ShortMAC-I The source eNB then identifies and verifies the UE based on the above information and if successful it forwards the UE's context to the target eNB. The shortMAC-I mentioned above is calculated considering, for example, the target cell ID.

One feature of LTE is that an RRC Connection can be suspended and resumed. When an RRC Connection is suspended for a UE, the UE stores the RRC configuration and moves to IDLE mode, which sometimes is referred to as the UE moves to suspended. When the eNB suspends the UE's connection, the eNB also provides an identity to the UE. The identity comprises one part that relates to the eNB that suspended the UE and one part that is a UE-specific identifier. This identity is called the resumeID.

When the UE later should move back to RRC connected mode (or in other words, that the RRC connection should be resumed), the UE indicates the identity to the eNB and, with this, the eNB can determine which eNB the UE was suspended by (note that the UE can move around in IDLE mode and hence the UE may end up connecting to another eNB compared to the eNB the UE was connected to prior to going to IDLE). The eNB that the UE tries to resume the connection towards could then request the previous eNB to provide the UE's context. And, the UE-specific part of the identity id used by the previous eNB to determine for which particular UE the new eNB is requesting the context. In addition to the resumeID, the UE also provides a shortMAC-I that, similar to for RRC re-establishment, is calculated based on the cell ID for the cell the UE connected to.

RRCConnectionRelease message is used to move a UE to suspended.

There currently exist certain challenge(s). For example, with multiple cell identities associated with a cell where different PLMNs are associated with different cell IDs the UE selects cell ID depending on which PLMN the UE has selected. This is, in current LTE, indicated to the eNB only when the UE sends the RRCConnectionSetupComplete-message (or RRCConnectionResumeComplete-NB-message) and would not be known to an eNB when the UE attempts to reestablish the connection to an eNB. Thus, the eNB will not know which cell ID the UE is considering when it tries to reestablish the connection and which cell ID the UE has used as input to the calculation of the shortMAC-I. Therefore, the target eNB may not be able to select which cell ID to indicate to the source eNB when it tries to retrieve the UE's context. As a result, the reestablishment attempt may fail.

SUMMARY

To address the foregoing problems with existing solutions, disclosed is systems and methods for cell identifier (Cell-ID) selection.

According to certain embodiments, a method performed by a wireless device for cell-ID selection, includes attempting a radio resource control (RRC) connection action. A designated Cell-ID is selected from a plurality of Cell IDs in a system information block (SIB). An identifier is determined based on the designated Cell-ID. The identifier is transmitted to a network node as part of the RRC connection action.

According to certain embodiments, a wireless device is provided for cell-ID selection. The wireless device includes processing circuitry configured to attempt a RRC connection action and select a designated Cell-ID from a plurality of Cell IDs in a SIB. The processing circuitry is also configured to determine an identifier based on the designated Cell-ID and transmit the identifier to a network node as part of the RRC connection action.

According to certain embodiments, a method by a network node is provided for cell-ID selection. The method includes selecting a designated Cell-ID from a plurality of Cell-IDs in a SIB and transmitting, to a second network node, a first message comprising the designated Cell-ID.

According to certain embodiments, a network node is provided for cell-ID selection. The network node includes processing circuitry configured to select a designated Cell-ID from a plurality of Cell-IDs in a SIB and transmit, to a second network node, a first message comprising the designated Cell-ID.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
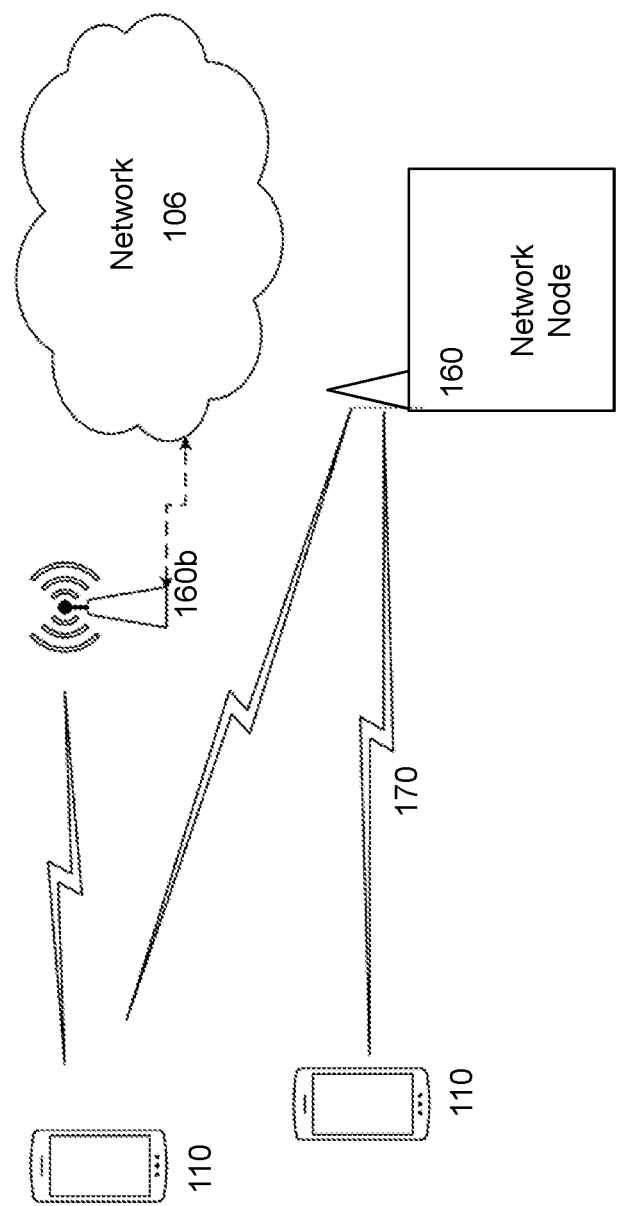
FIG. 1 illustrates an example wireless network for cell identifier (Cell-ID) selection, according to certain embodiments.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Certain aspects of the present disclosure and their embodiments may provide solutions to challenges described above. For example, certain embodiments disclosed herein provide methods to avoid that RRC Connection Reestablishment and/or Resume attempts fail due to use of incorrect or ambiguous Cell ID in related RRC and/or X2 procedures and/or signalling and/or IEs/fields. Methods resolve and/or avoid ambiguity with regard to Cell ID used in procedures and signalling.

It should be noted that while herein the RRC Connection Reestablishment procedure is used as an example for when the described embodiments are useful, the described embodiments could also be used in other situations such as in the RRC Connection Resume. Below is a high level description of certain embodiments.

For example, according to certain embodiments, a method may include using designated Cell-ID in computation of shortMAC-I and/or shortResumeMAC-I:
  wherein designated ID is used by both UE and NW (Variety 1.a); or
  wherein designated ID is used by the UE; the target eNB indicates some ID pertaining to target cell to source eNB; the source eNB tries set of IDs associated with the ID indicated by target eNB (Variety 1.b); or
  wherein designated ID is used by the UE; the Target eNB provides set of IDs to Source eNB which iterates through IDs in trial-and-error process (Variety 1.c); or
  wherein designated ID is used by the UE; the Target eNB iterates through set of IDs in trial-and-error process (Variety 1.d)

In a particular embodiment, for example, the method identified as Variety 1.a above may include both the UE and the network using the designated Cell-ID in computation of shortMAC-I and/or shortResumeMAC-I (Variety 1.a) as follows:
  a) UE uses the designated Cell-ID/ECGI in computation of shortMAC-I and/or shortResumeMAC-I
  b) Target eNB provides the designated Cell-ID/ECGI to source eNB in RLF indication and/or Retrieve UE context/Resume procedure
  c) Source eNB checks validity of shortMAC-I and/or shortResumeMAC-I using Cell-ID/ECGI provided by target eNB
    i) If the shortMAC-I and/or shortResumeMAC-I is valid, the source eNB provides the UE context to a target eNB In some embodiments, the UE acquires a set where each entry in the set comprises:
  A list of PLMN ID
  A cell ID
  A TAC The UE determines a first cell ID. This cell ID is determined to be the cell ID associated with the PLMN which the UE has selected. For example, by referring to the example in the background, if the UE selects PLMN B the UE considers the first cell ID to be 1. While if the UE selects PLMN C the UE considers the first cell ID to be 2.

The UE determines a second cell ID used for connection reestablishment procedure. When it here says that the cell ID is used for a connection reestablishment procedure and will therefore be referred to herein as a reestablishment cell ID. That this cell ID is used during a reestablishment procedure may comprise that the UE uses this second cell ID for determining a value used to identify and/or verify the UE (such as the shortMAC-I value). The second cell ID may be determined by selecting a cell ID based on a rule where the rule may be to select the first cell ID which occur in the message. For example, the second cell ID in the example used in the background may be 1 since that is the first occurring cell ID.

When the eNB initiate a procedure to request the context of the UE which is attempting to reestablish the connection, the eNB (which in this scenario may be referred to as the target eNB) may indicate the reestablishment cell ID towards the source eNB. The eNB would according to this embodiment apply the same rule for selecting the reestablishment cell ID as the UE applies.

The source eNB then uses the reestablishment cell ID which it received from the target eNB to identify and verify the UE by comparing the expected/calculated shortMAC-I with the shortMAC-I provided by the target eNB (which the target eNB got from the UE).

Below is an example of how to implement the above in RRC. Changes compared to legacy specification are shown with underlined text.
VarShortMAC-Input UE Variable

```
-- ASN1START
VarShortMAC-Input ::=          SEQUENCE {
  cellIdentity                   CellIdentity,
  physCellId                     PhysCellId,
  c-RNTI                         C-RNTI
}
-- ASN1STOP
```

| VarShortMAC-Input field descriptions |
|---|
| cellIdentity<br>Set to CellIdentity included in field cellIdentity (without suffix) in SIB1 of the current cell.<br>c-RNTI<br>Set to C-RNTI that the UE had in the PCell it was connected to prior to the failure.<br>phys CellId<br>Set to the physical cell identity of the PCell the UE was connected to prior to the failure. |

Below is another example of how to implement the above in RRC. Changes compared to legacy specification are shown with underlined text.
VarShortMAC-Input UE Variable

```
-- ASN1START
VarShortMAC-Input ::=          SEQUENCE {
  cellIdentity                   CellIdentity,
  physCellId                     PhysCellId,
  c-RNTI                         C-RNTI
}
-- ASN1STOP
```

| VarShortMAC-Input field descriptions |
|---|
| cellIdentity<br>Set to CellIdentity included in first occurance of field cellIdentity in SIB1 of the current cell.<br>c-RNTI<br>Set to C-RNTI that the UE had in the PCell it was connected to prior to the failure.<br>physCellId<br>Set to the physical cell identity of the PCell the UE was connected to prior to the failure. |

While the above examples relate to RRC connection reestablishment and RRC connection reestablishment request, similar/analogous examples can be considered related to RRC connection resume and RRC connection resume request. E.g.,
VarShortResumeMAC-Input UE Variable

```
-- ASN1START
VarShortResumeMAC-Input-r13 ::=    SEQUENCE {
  cellIdentity-r13                   CellIdentity,
  physCellId-r13                     PhysCellId,
  c-RNTI-r13                         C-RNTI,
  resumeDiscriminator-r13            BIT STRING(SIZE(1))
}
-- ASN1STOP
```

| VarShortResumeMAC-Input field descriptions |
| --- |
| cellIdentity<br>Set to CellIdentity included in field cellIdentity (without suffix) in SIB1 of the current cell.<br>c-RNTI<br>Set to C-RNTI that the UE had in the PCell it was connected to prior to suspension of the RRC connection.<br>physCellId<br>Set to the physical cell identity of the PCell the UE was connected to prior to suspension of the RRC connection..<br>resumeDiscriminator<br>A constant that allows differentiation in the calculation of the MAC-I for shortResumeMAC-I<br>The resumeDiscriminator is set to '1' |

VarShortResumeMAC-Input UE Variable

```
-- ASN1START
VarShortResumeMAC-Input-r13 ::=     SEQUENCE {
    cellIdentity-r13                CellIdentity,
    physCellId-r13                  PhysCellId,
    c-RNTI-r13                      C-RNTI,
    resumeDiscriminator-r13         BIT STRING(SIZE(1))
}
-- ASN1STOP
```

| VarShortResumeMAC-Input field descriptions |
| --- |
| cellIdentity<br>Set to CellIdentity included in first occurance of field cellIdentity in SIB1 of the current cell.<br>c-RNTI<br>Set to C-RNTI that the UE had in the PCell it was connected to prior to suspension of the RRC connection.<br>physCellId<br>Set to the physical cell identity of the PCell the UE was connected to prior to suspension of the RRC connection..<br>resumeDiscriminator<br>A constant that allows differentiation in the calculation of the MAC-I for shortResumeMAC-I<br>The resumeDiscriminator is set to '1' |

According to certain other embodiments that correspond to Variety 1.b described above, a method may include using designated Cell-ID in computation of shortMAC-I and/or shortResumeMAC-I as follows:

a) UE uses the designated Cell-I/ECGI in computation of shortMAC-I and/or shortResumeMAC-I.
b) Target eNB provides a Cell-ID/ECGI pertaining to the target cell to source eNB in RLF indication and/or Retrieve UE context/Resume procedure.
  i) In some embodiments, the target eNB uses a Cell-ID/ECGI which is under its control and is associated with the target cell.
  ii) In some embodiments the target eNB uses the Cell-ID/ECGI corresponding to the primary PLMN of the cell or the primary Cell-ID/ECGI of the cell.
  iii) In some embodiments the target eNB uses a special Cell-ID/ECGI configured in the eNB.
  iv) In some embodiments, e.g., where the target eNB is not the main/master controlling eNB of the cell, the Cell-ID/ECGI of which corresponds to/is associated with the primary PLMN of the cell and/or which is the primary Cell-ID/ECGI of the cell, the target eNB is configured with the relevant Cell-ID/ECGI corresponding to the primary PLMN and/or with the relevant primary Cell-ID/ECGI.
c) Source eNB checks validity of shortMAC-I and/or shortResumeMAC-I using a set of Cell-IDs/ECGIs associated with the target eNB and/or with the Cell-ID/ECGI provided/indicated by the target eNB.
  i) The set of Cell-IDs/ECGIs associated with the target eNB and/or with the Cell-ID/ECGI provided/indicated by the target eNB can be configured in the source eNB.
  ii) The source eNB may try Cell-IDs/ECGIs sequentially or in parallel
  iii) If the shortMAC-I and/or shortResumeMAC-I is valid, the source eNB provides the UE context to a target eNB
  iv) If not valid, the source eNB repeats procedure with a different (not yet tried) Cell-ID/ECGI from the set of Cell-IDs/ECGIs According to certain other embodiments that correspond to Variety 1.c described above, a method includes using designated Cell-ID in computation of shortMAC-I and/or shortResumeMAC-I as follows:

a) UE uses the designated Cell-ID/ECGI in computation of shortMAC-I and/or shortResumeMAC-I
b) Target eNB provides set of Cell-ID/ECGI to source eNB in RLF indication and/or Retrieve UE context/Resume procedure
  i) In some embodiments the set of Cell/IDs&ECGIs is the set of Cell-IDs/ECGIs associated with the target cell's physical cell.
  ii) In some embodiments the set of Cell/IDs&ECGIs is the set of Cell-IDs/ECGIs served by the target eNB.
  iii) In some embodiments the set of Cell/IDs&ECGIs is a set of Cell-IDs/ECGIs configured in the eNB.
c) Source eNB checks validity of shortMAC-I and/or shortResumeMAC-I using Cell-IDs/ECGIs provided by target eNB
  i) The source eNB may try Cell-IDs/ECGIs sequentially or in parallel
  ii) If the shortMAC-I and/or shortResumeMAC-I is valid, the source eNB provides the UE context to a target eNB
  iii) If not valid, the source eNB repeats procedure with a different (not yet tried) Cell-ID/ECGI from the set of Cell-IDs/ECGIs According to certain other embodiments that correspond to Variety 1.d described above, a method includes using designated Cell-ID in computation of shortMAC-I and/or shortResumeMAC-I as follows:

a) UE uses the designated Cell-ID/ECGI in computation of shortMAC-I and/or shortResumeMAC-I
b) Target eNB provides a Cell-ID/ECGI to source eNB in RLF indication and/or Retrieve UE context/Resume procedure. The Cell-ID/ECGI is one Cell-ID/ECGI from a set of Cell-IDs/ECGIs.
  i) In some embodiments the set of Cell/IDs&ECGIs is the set of Cell-IDs/ECGIs associated with the target cell's physical cell.
  ii) In some embodiments the set of Cell/IDs&ECGIs is the set of Cell-IDs/ECGIs served by the target eNB.
  iii) In some embodiments the set of Cell/IDs&ECGIs is a set of Cell-IDs/ECGIs configured in the eNB.

c) Source eNB checks validity of shortMAC-I and/or shortResumeMAC-I using Cell-ID/ECGI provided by target eNB
   i) If the shortMAC-I and/or shortResumeMAC-I is valid, the source eNB provides the UE context to a target eNB
d) If the RLF indication and/or Retrieve UE context/Resume procedure (with the provided Cell-ID/ECGI) does not succeed/produce/return the UE context, the target eNB repeats procedure with a different (not yet tried) Cell-ID/ECGI from the set of Cell-IDs/ECGIs.

According to certain other embodiments, methods may include using Cell-ID/ECGI associated with selected PLMN in computation of shortMAC-I and/or shortResumeMAC-I:
   wherein the UE uses ID associated with selected PLMN; the target eNB indicates some ID pertaining to target cell to source eNB; the source eNB tries set of IDs associated with the ID indicated by target eNB (Variety 2.a); or
   wherein the UE uses ID associated with selected PLMN; the target eNB provides set of IDs to Source eNB which iterates through IDs in trial-and-error process (Variety 2.b); or
   wherein the UE uses ID associated with selected PLMN; the target eNB iterates through set of IDs in trial-and-error process (Variety 2.c)

More specifically, according to certain embodiments that correspond to Variety 2.a described above, a method may include using Cell-ID/ECGI associated with selected PLMN in computation of shortMAC-I and/or shortResumeMAC-I (as follows:
   a) UE uses the Cell-ID/ECGI associated with the selected PLMN in computation of shortMAC-I and/or shortResumeMAC-I
   b) Target eNB provides a Cell-ID/ECGI pertaining to the target cell to source eNB in RLF indication and/or Retrieve UE context/Resume procedure.
      i) In some embodiments, the target eNB uses a Cell-ID/ECGI which is under its control and is associated with the target cell.
      ii) In some embodiments the target eNB uses the Cell-ID/ECGI corresponding to the primary PLMN of the cell or the primary Cell-ID/ECGI of the cell.
      iii) In some embodiments the target eNB uses a special Cell-ID/ECGI configured in the eNB.
      iv) In some embodiments, e.g., where the target eNB is not the main/master controlling eNB of the cell, the Cell-ID/ECGI of which corresponds to/is associated with the primary PLMN of the cell and/or which is the primary Cell-ID/ECGI of the cell, the target eNB is configured with the relevant Cell-ID/ECGI corresponding to the primary PLMN and/or with the relevant primary Cell-ID/ECGI.
   c) Source eNB checks validity of shortMAC-I and/or shortResumeMAC-I using a set of Cell-IDs/ECGIs associated with the target eNB and/or with the Cell-ID/ECGI provided/indicated by the target eNB.
      i) The set of Cell-IDs/ECGIs associated with the target eNB and/or with the Cell-ID/ECGI provided/indicated by the target eNB can be configured in the source eNB.
      ii) The source eNB may try Cell-IDs/ECGIs sequentially or in parallel
      iii) If the shortMAC-I and/or shortResumeMAC-I is valid, the source eNB provides the UE context to a target eNB
      iv) If not valid, the source eNB repeats procedure with a different (not yet tried) Cell-ID/ECGI from the set of Cell-IDs/ECGIs According to certain embodiments that correspond to Variety 2.b described above, a method may include using Cell-ID/ECGI associated with selected PLMN in computation of shortMAC-I and/or shortResumeMAC-I as follows:
   a) UE uses the Cell-ID/ECGI associated with the selected PLMN in computation of shortMAC-I and/or shortResumeMAC-I
   b) Target eNB provides set of Cell-ID/ECGI to source eNB in RLF indication and/or Retrieve UE context/Resume procedure
      i) In some embodiments the set of Cell/IDs&ECGIs is the set of Cell-IDs/ECGIs associated with the target cell's physical cell.
      ii) In some embodiments the set of Cell/IDs&ECGIs is the set of Cell-IDs/ECGIs served by the target eNB.
      iii) In some embodiments the set of Cell/IDs&ECGIs is a set of Cell-IDs/ECGIs configured in the eNB.
   c) Source eNB checks validity of shortMAC-I and/or shortResumeMAC-I using Cell-IDs/ECGIs provided by target eNB
      i) The source eNB may try Cell-IDs/ECGIs sequentially or in parallel
      ii) If the shortMAC-I and/or shortResumeMAC-I is valid, the source eNB provides the UE context to a target eNB
      iii) If not valid, the source eNB repeats procedure with a different (not yet tried) Cell-ID/ECGI from the set of Cell-IDs/ECGIs According to certain embodiments that correspond to Variety 2.c described above, a method may include using Cell-ID/ECGI associated with selected PLMN in computation of shortMAC-I and/or shortResumeMAC-I as follows:
   a) UE uses the Cell-ID/ECGI associated with the selected PLMN in computation of shortMAC-I and/or shortResumeMAC-I
   b) Target eNB provides a Cell-ID/ECGI to source eNB in RLF indication and/or Retrieve UE context/Resume procedure. The Cell-ID/ECGI is one Cell-ID/ECGI from a set of Cell-IDs/ECGIs.
      i) In some embodiments the set of Cell-IDs/ECGIs is the set of Cell-IDs/ECGIs associated with the target cell's physical cell.
      ii) In some embodiments the set of Cell-IDs/ECGIs is the set of Cell-IDs/ECGIs served by the target eNB.
      iii) In some embodiments the set of Cell-IDs/ECGIs is a set of Cell-IDs/ECGIs configured in the eNB.
   c) Source eNB checks validity of shortMAC-I and/or shortResumeMAC-I using Cell-ID/ECGI provided by target eNB
      i) If the shortMAC-I and/or shortResumeMAC-I is valid, the source eNB provides the UE context to a target eNB
      ii) If the RLF indication and/or Retrieve UE context/Resume procedure (with the provided Cell-ID/ECGI) does not succeed/produce/return the UE context, the target eNB may repeat procedure with a different (not yet tried) Cell-ID/ECGI from the set of Cell-IDs/ECGIs.

According to certain embodiments such as where the target cell has a primary PLMN, the designated Cell-ID/ECGI used in computation of shortMAC-I and/or for RLF indication or Resume/UE context retrieval is the Cell-ID/ECGI which corresponds to the primary PLMN of the (physical) cell.

According to certain embodiments such as where the target cell has a primary Cell-ID/ECGI, the designated Cell-ID/ECGI used in computation of shortMAC-I and/or for RLF indication or Resume/UE context retrieval is the primary Cell-ID/ECGI of the cell.

According to certain embodiments such as where the target cell does not have a (designated) primary PLMN or primary Cell-ID/ECGI):
 a) the target cell designates one Cell-ID/ECGI as the Cell-ID/ECGI to be used in computation of short-MAC-I and for RLF indication and/or Resume/UE context retrieval.
 b) Alternatively the target cell designates one PLMN the associated Cell-ID/ECGI of which shall be used as the Cell-ID/ECGI in computation of shortMAC-I and for RLF indication and/or Resume/UE context retrieval.

According to certain embodiments, the designated Cell-ID/ECGI is a Cell-ID/ECGI configured in the eNB.

According to certain embodiments such as where the target eNB is not the main/master controlling eNB of the cell, the Cell-ID/ECGI of which is the designated Cell-ID/ECGI, the target eNB is configured with the relevant (designated) Cell-ID/ECGI.

According to certain embodiments, the designated Cell-ID/ECGI and/or designated PLMN is indicated to the UE such as, for example, in system information.

According to certain embodiments, a target eNB to which the source eNB provides the UE context in case the shortMAC-I and/or shortResumeMAC-I is valid:
 In some embodiments, the target eNB for the UE context is the eNB which originated RLF indication or retrieve UE context procedure.
 In some embodiments, the target eNB for the UE context is the eNB which is associated with Cell-ID/ECGI provided/indicated by Cell-ID/ECGI in the RLF indication and/or Retrieve UE Context/Resume procedure.
 In some embodiments, the target eNB for the UE context is the eNB which is associated with the Cell-ID/ECGI for which the shortMAC-I and/or shortResumeMAC-I is valid.
 In some embodiments, the source eNB (prior to providing the UE context to a target eNB) verifies that the Cell-ID/ECGI for which the shortMAC-I and/or shortResumeMAC-I is valid is associated with and/or corresponds to the Cell-ID/ECGI provided/indicated in the RLF indication and/or Retrieve UE context/Resume procedure/message and/or to the eNB originating the RLF indication or retrieve UE context/resume procedure.
 In some embodiments, the source eNB (prior to providing the UE context to a target eNB) verifies that the Cell-ID/ECGI provided/indicated in the RLF indication and/or Retrieve UE context/Resume procedure/message corresponds to the eNB originating the RLF indication or retrieve UE context/resume procedure.

For Radio link failure (RLF) reporting and connection establishment failure reporting it is considered that UE may report the Cell ID associated with selected PLMN. In some embodiments of the invention, the Cell ID used and/or reported by the UE and/or NW node in the context of RRC Connection Reestablishment or RRC Connection Resume is different from the Cell ID used and/or reported in the context of RLF and/or connection establishment failure reporting. E.g., the UE and/or NW node may select a different Cell ID to use/report for RRC Connection Reestablishment and/or RRC Connection Resume than for RLF reporting or connection establishment failure reporting.

Examples of what may be reported in which context:
Connection Reestablishment: Cell-Id based on known rule according to embodiments above
 As field/IE cellIdentity in VarShortMAC-Input used in calculation of field/IE shortMAC-I included in RRC-ConnectionReestablishmentRequest
 As Re-establishment cell ECGI in X2 RLF INDICATION
Connection Resume: cell-id based on known rule according to embodiments below
 As filed/IE cellIdentity in VarShortResumeMAC-Input used in calculation of field/IE shortResumeMAC-I in RRCConnectionResumeRequest
 As New E-UTRAN Cell Identifier in X2 RETRIEVE UE CONTEXT REQUEST
Radio link failure reporting: cell-id/CellIdentity associated with selected PLMN
 As field/IE failedPCellId in IE RLF-Report in UEInformationResponse
 As Re-establishment cell ECGI in X2 RLF INDICATION
Connection establishment failure reporting: cell-id/CellIdentity associated with selected PLMN
 As field/IE failedCellId in IE ConnEstFailReport in UEInformationResponse It shall be understood that Cell ID/Cell-ID/Cell Id as used herein, may be, refer, correspond or relate to E-UTRAN Cell Identity (ECI), CellIdentity, Cell ID part of ECI/CellIdentity, Physical Cell Id (PCI) or some other relevant cell identifier or cell identity.

In some embodiments or scenarios, RRC can be implemented in a cloud hence some embodiments may be applicable to a cloud implementation.

FIG. 1 illustrates an example wireless network, in accordance with some embodiments. Although the subject matter described herein may be implemented in any appropriate type of system using any suitable components, the embodiments disclosed herein are described in relation to a wireless network, such as the example wireless network illustrated in FIG. 1. For simplicity, the wireless network of FIG. 1 only depicts network 106, network nodes 160 and 160b, and wireless devices (WDs) 110. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Figure 2:
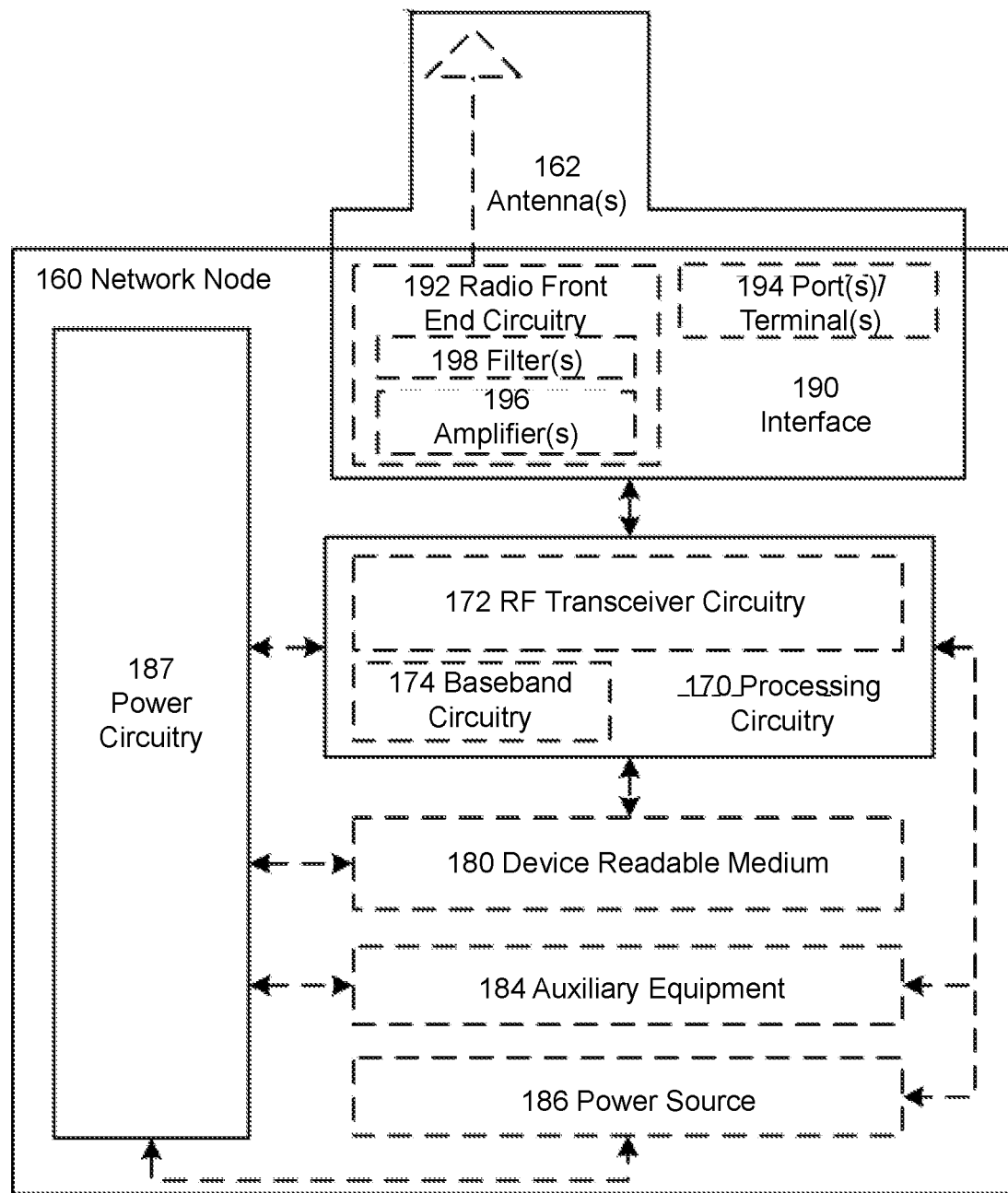
FIG. 2 illustrates an example network node for Cell-ID selection, according to certain embodiments.

FIG. 2 illustrates an example network node 160, according to certain embodiments. As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 2, network node 160 includes processing circuitry 170, device readable medium 180, interface 190, auxiliary equipment 184, power source 186, power circuitry 187, and antenna 162. Although network node 160 illustrated in the example wireless network of FIG. 1 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units.

In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 2 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

Figure 3:
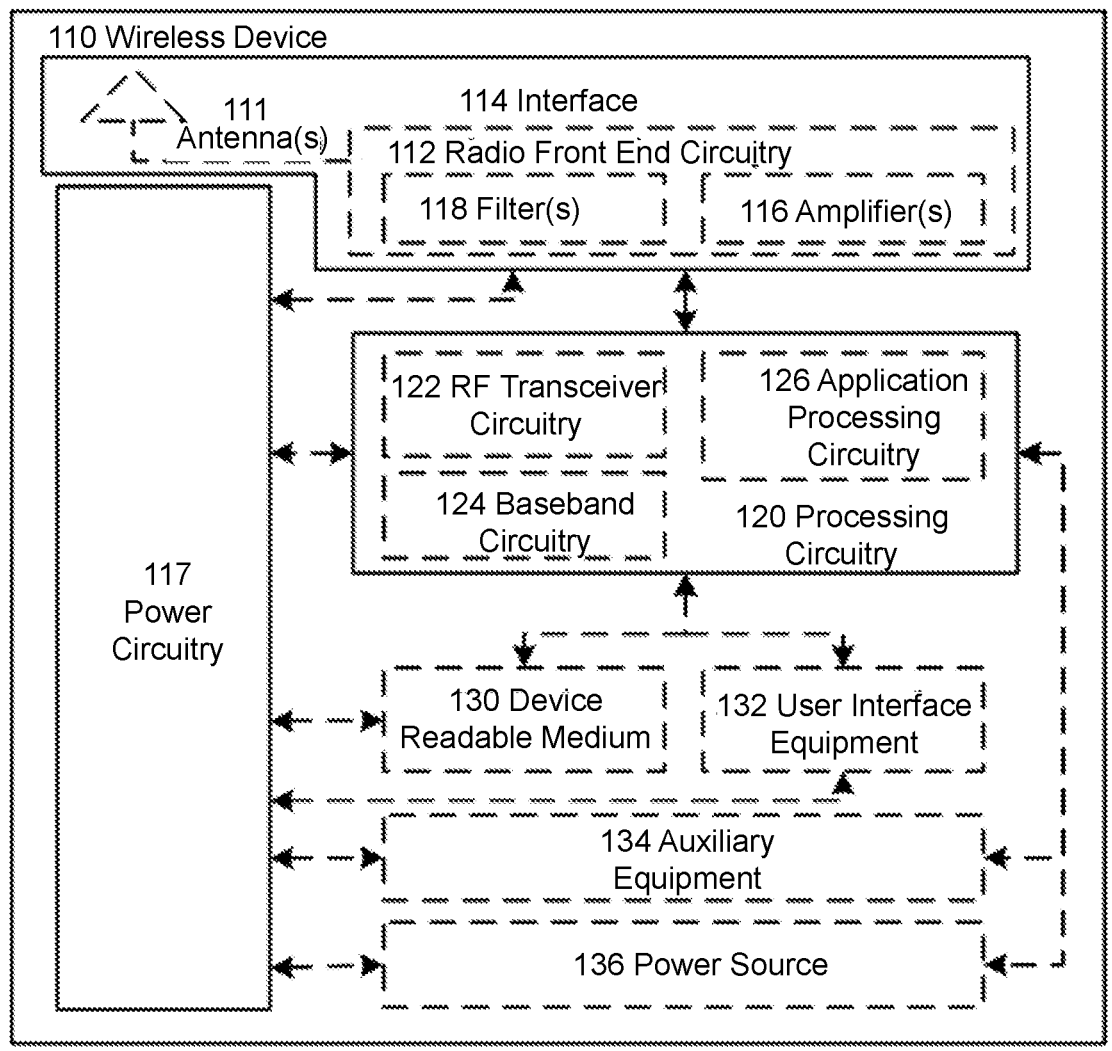
FIG. 3 illustrates an example wireless device for Cell-ID selection, according to certain embodiments.

FIG. 3 illustrates an example WD, according to certain embodiments. As used herein, WD refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VOIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120, and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110 as a whole, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110, and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network, and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry. Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Figure 4:
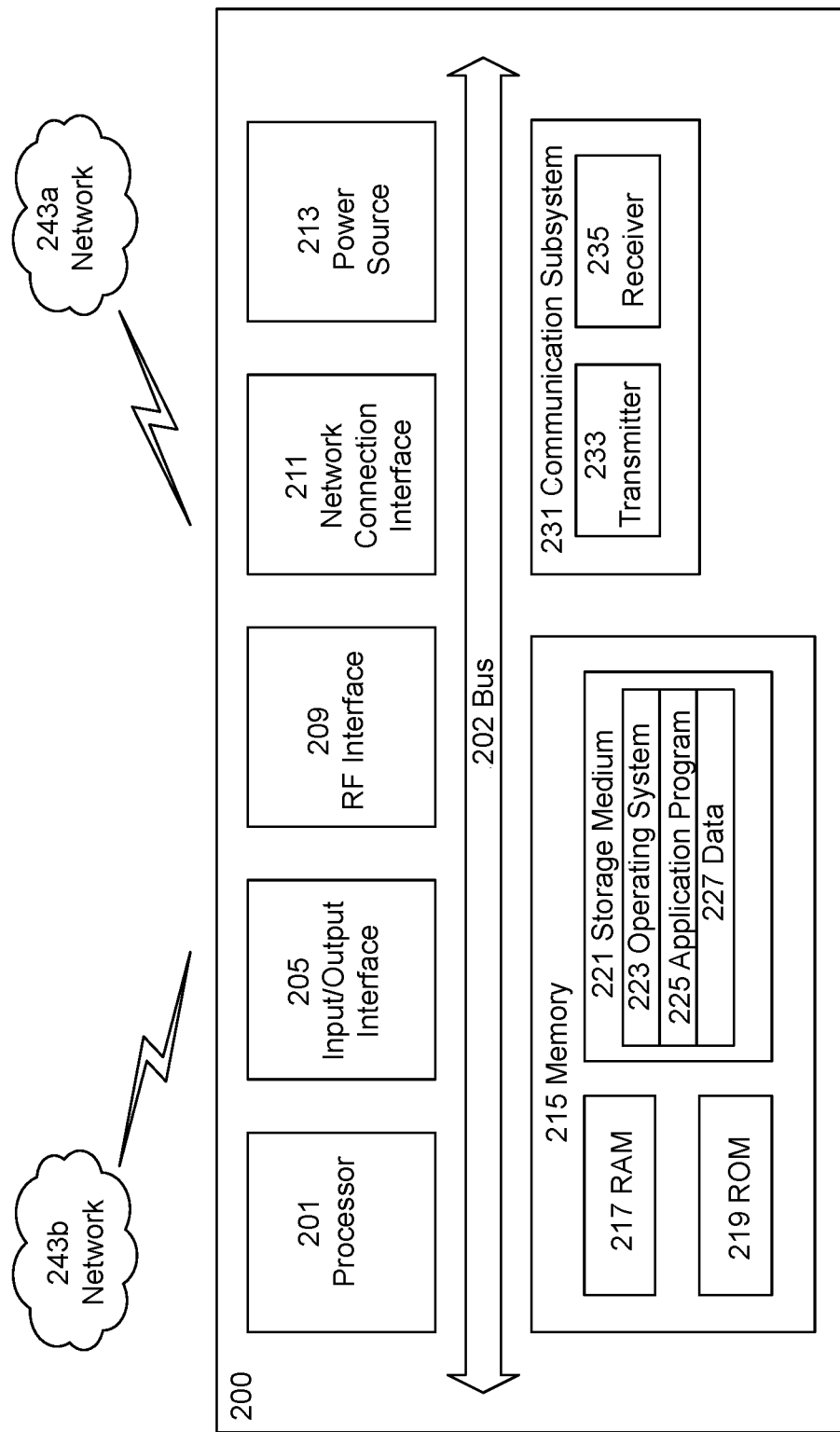
FIG. 4 illustrate an example user equipment for Cell-ID selection, according to certain embodiments.

FIG. 4 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 2200 may be any UE identified by the $3^{rd}$ Generation Partnership Project (3GPP), including a NB-IoT UE, a machine type communication (MTC) UE, and/or an enhanced MTC (eMTC) UE. UE 200, as illustrated in FIG. 4, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE may be used interchangeable. Accordingly, although FIG. 4 is a UE, the components discussed herein are equally applicable to a WD, and vice-versa.

In FIG. 4, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 4, or only a subset of the components. The level of integration between the components may vary from one UE to another UE. Further, certain UEs may contain multiple instances of a component, such as multiple processors, memories, transceivers, transmitters, receivers, etc.

In FIG. 4, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 4, RF interface 209 may be configured to provide a communication interface to RF components such as a transmitter, a receiver, and an antenna. Network connection interface 211 may be configured to provide a communication interface to network 243*a*. Network 243*a* may encompass wired and/or wireless networks such as a local-area network (LAN), a wide-area network (WAN), a computer network, a wireless network, a telecommunications network, another like network or any combination thereof. For example, network 243*a* may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 4, processing circuitry 201 may be configured to communicate with network 243*b* using communication subsystem 231. Network 243*a* and network 243*b* may be the same network or networks or different network or networks. Communication subsystem 231 may be configured to include one or more transceivers used to communicate with network 243*b*. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243*b* may encompass wired and/or wireless networks such as a local-area network (LAN), a wide-area network (WAN), a computer network, a wireless network, a telecommunications network, another like network or any combination thereof. For example, network 243*b* may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 5:
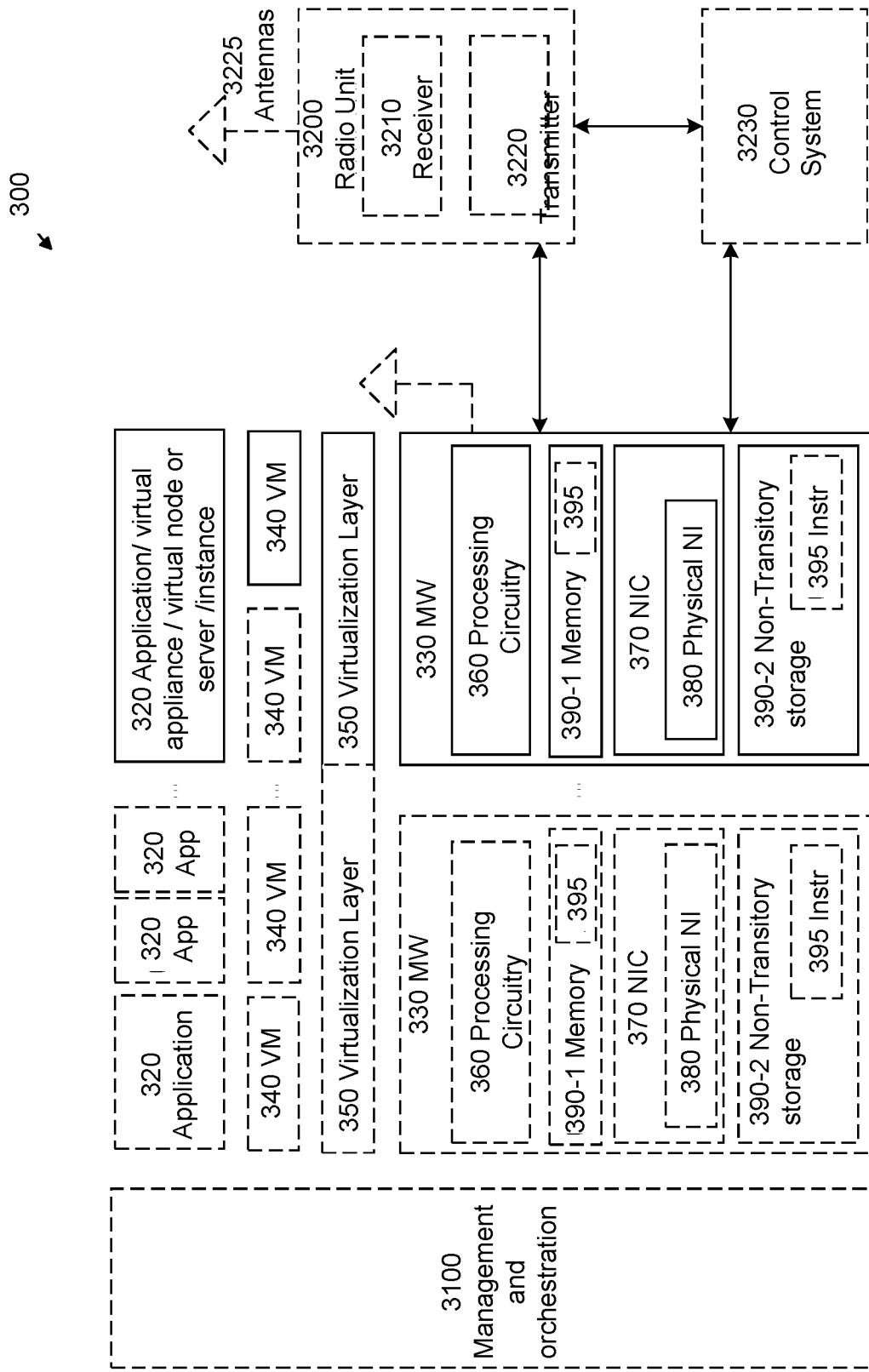
FIG. 5 illustrates a virtualization environment in which functions implemented by some embodiments may be virtualized, according to certain embodiments.

FIG. 5 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 5, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 5.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signalling can be effected with the use of control system 3230 which may alternatively be used for communication between the hardware nodes 330 and radio units 3200.

Figure 6:
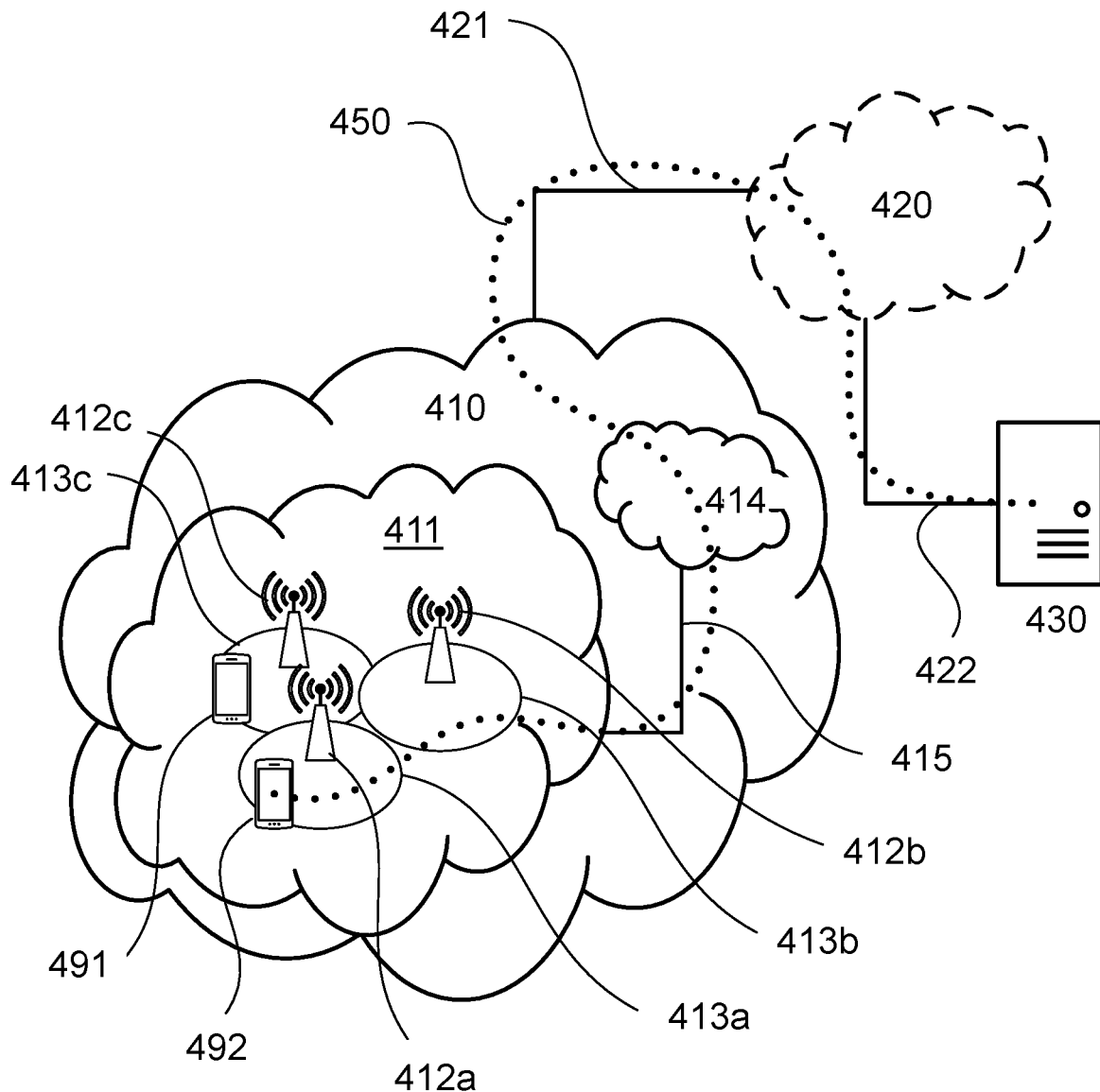
FIG. 6 illustrates a telecommunication network connected via an intermediate network to a host computer, according to certain embodiments.

FIG. 6 illustrates a telecommunication network connected via an intermediate network to a host computer in accordance with some embodiments. With reference to FIG. 6, in accordance with an embodiment, a communication system includes telecommunication network 410, such as a 3GPP-type cellular network, which comprises access network 411, such as a radio access network, and core network 414. Access network 411 comprises a plurality of base stations 412*a*, 412*b*, 412*c*, such as NBs, eNBs, gNBs or other types of wireless access points, each defining a corresponding coverage area 413*a*, 413*b*, 413*c*. Each base station 412*a*, 412*b*, 412*c* is connectable to core network 414 over a wired or wireless connection 415. A first UE 491 located in coverage area 413*c* is configured to wirelessly connect to, or be paged by, the corresponding base station 412*c*. A second UE 492 in coverage area 413*a* is wirelessly connectable to the corresponding base station 412*a*. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more subnetworks (not shown).

The communication system of FIG. 6 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 7:
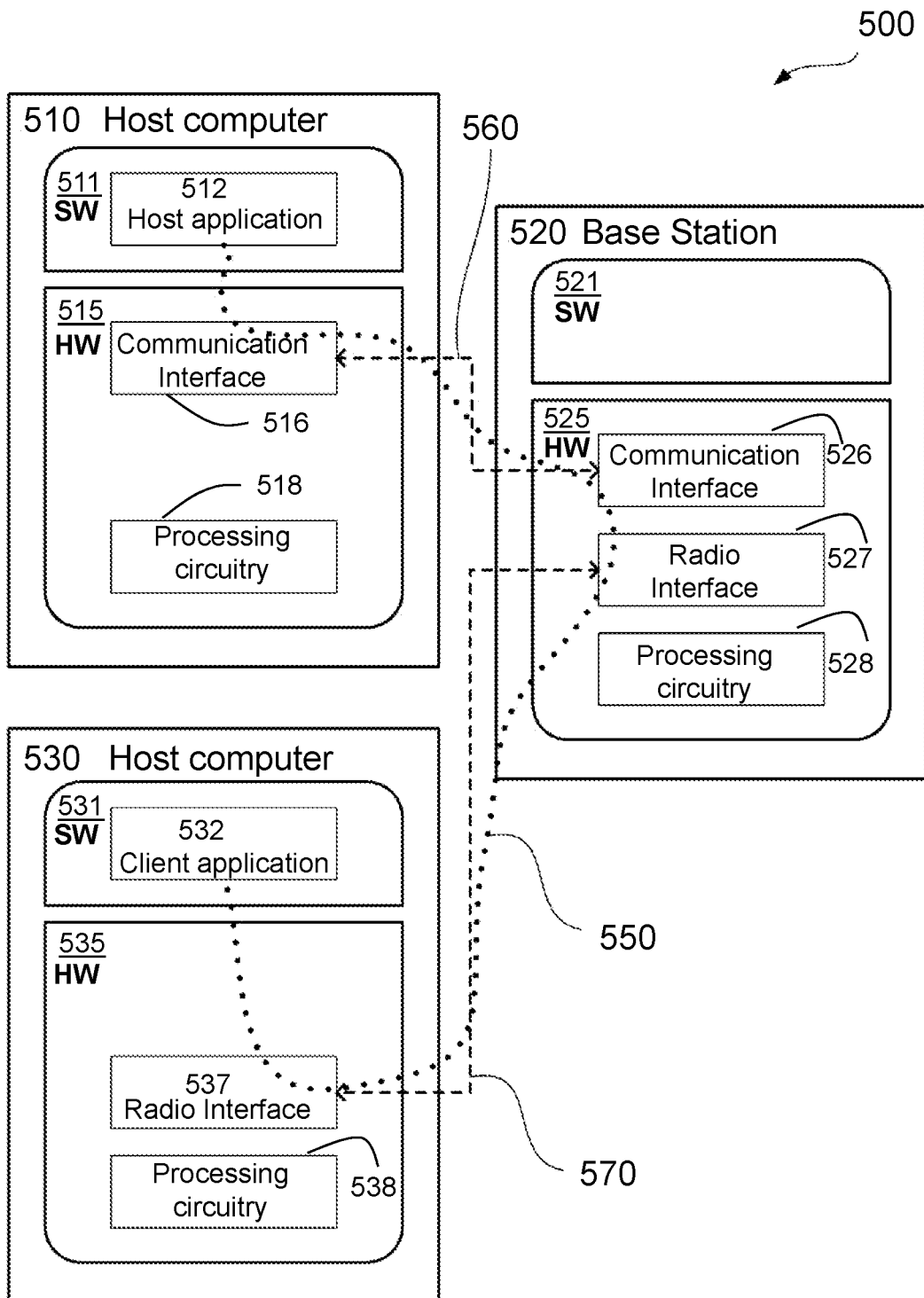
FIG. 7 illustrates a generalized block diagram of a host computer communicating via a base station with a user equipment over a partially wireless connection, according to certain embodiments.

FIG. 7 illustrates a host computer communicating via a base station with a user equipment over a partially wireless connection in accordance with some embodiments. Example implementations, in accordance with an embodiment, of the UE, base station and host computer discussed in the preceding paragraphs will now be described with reference to FIG. 7. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 7) served by base station 520. Communication interface 526 may be configured to facilitate connection 560 to host computer 510. Connection 560 may be direct or it may pass through a core network (not shown in FIG. 7) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 7 may be similar or identical to host computer 430, one of base stations 412*a*, 412*b*, 412*c* and one of UEs 491, 492 of FIG. 6, respectively. This is to say, the inner workings of these entities may be as shown in FIG. 7 and independently, the surrounding network topology may be that of FIG. 6.

In FIG. 7, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the success-rate of reestablishment and connection resume and thereby provide benefits such as improved connection time and less interruption of service.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figures 8, 9:
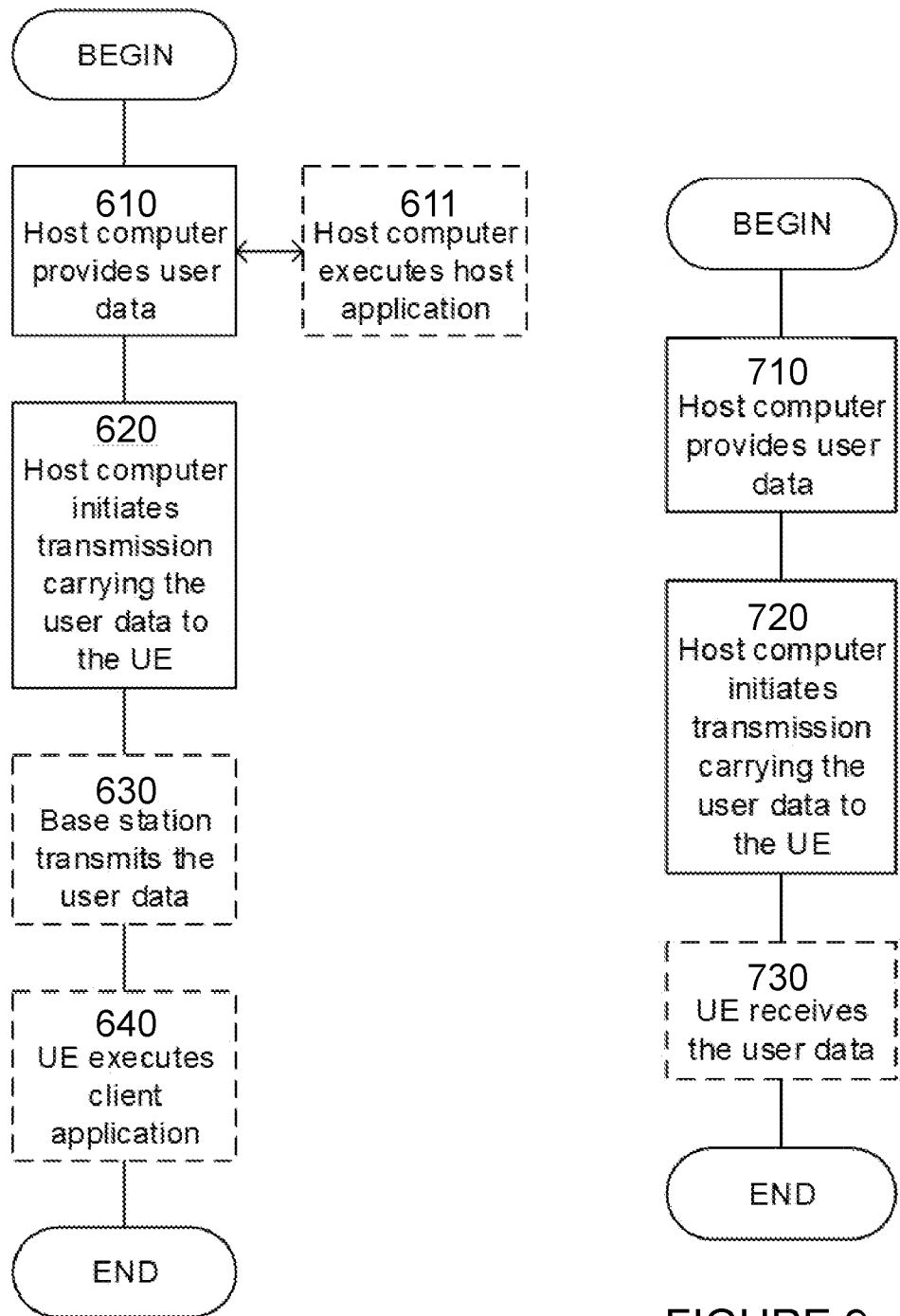
FIG. 8 illustrates a method implemented in a communication system, according to one embodiment.
FIG. 9 illustrates another method implemented in a communication system, according to one embodiment.

FIG. 8 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 8 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

FIG. 9 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 9 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figures 10, 11:
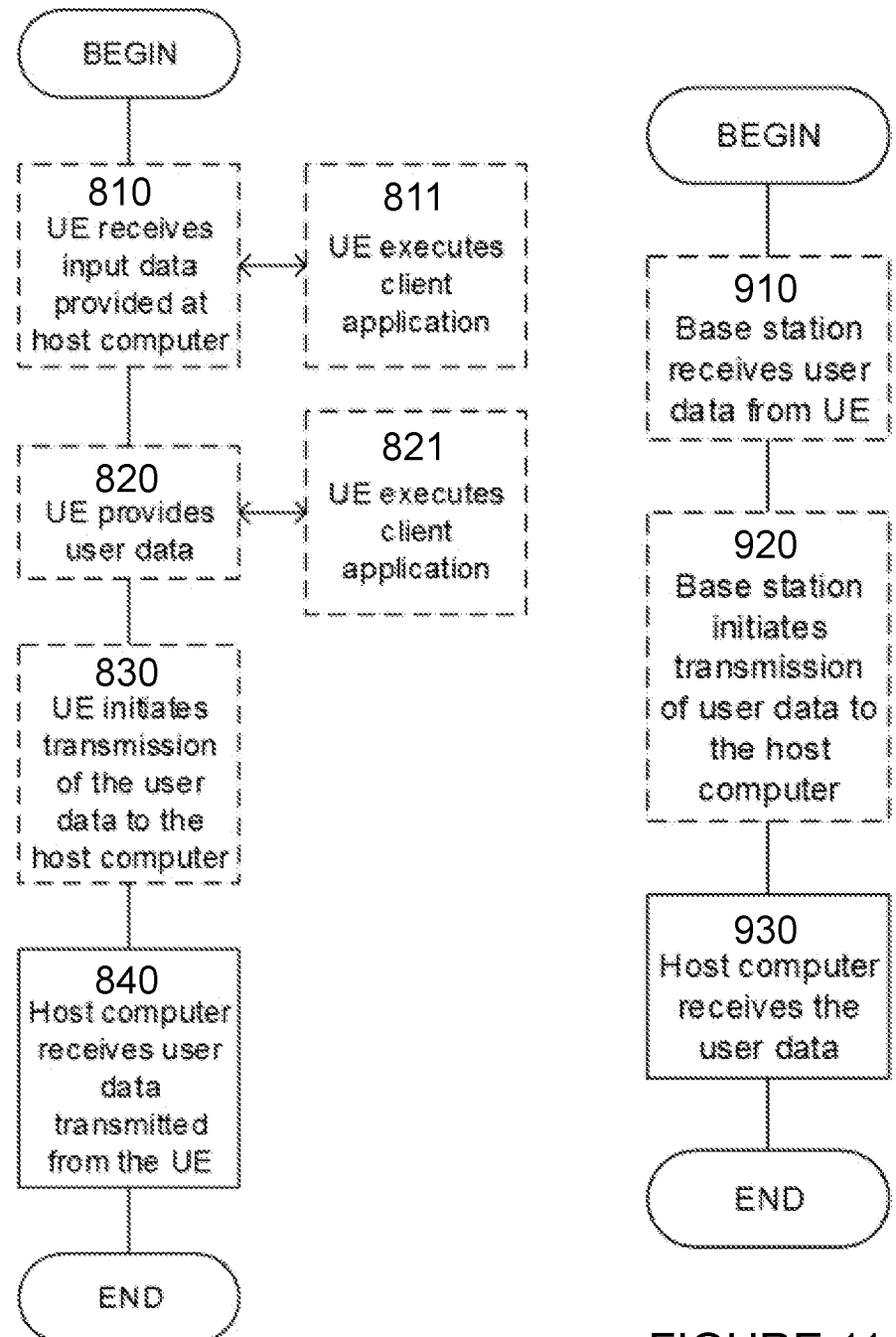
FIG. 10 illustrates another method implemented in a communication system, according to one embodiment.
FIG. 11 illustrates another method implemented in a communication system, according to one embodiment.

FIG. 10 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 10 will be included in this section. In step 810 (which may be optional), the UE receives input data provided by the host computer. Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

FIG. 11 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 11 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 12:
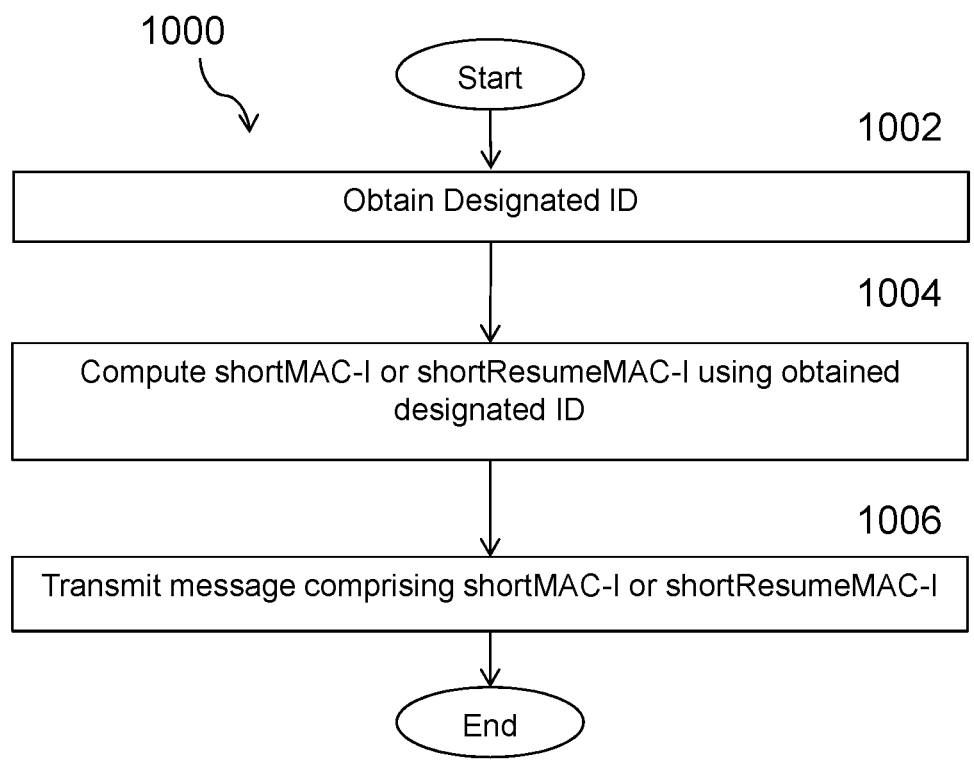
FIG. 12 illustrates an example method by a wireless device for Cell-ID selection, according to certain embodiments.

FIG. 12 illustrates a method by a wireless device, in accordance with certain embodiments. The method begins at step 1002 with the wireless device obtaining a designated ID. At step 1004, the wireless device uses the designated ID to compute a shortMAC-I or a shortResumeMAC-I. At step 1006, the wireless device transmits a message comprising the computed shortMAC-I or shortResumeMAC-I. The message may be transmitted to a target network node (e.g., a handover target). The target network node may provide designated ID to the source network node. The source network node may check the validity of the shortMAC-I or the shortResumeMAC-I. If they are valid, the source network node provides the wireless device context to the target network node.

Figure 13:
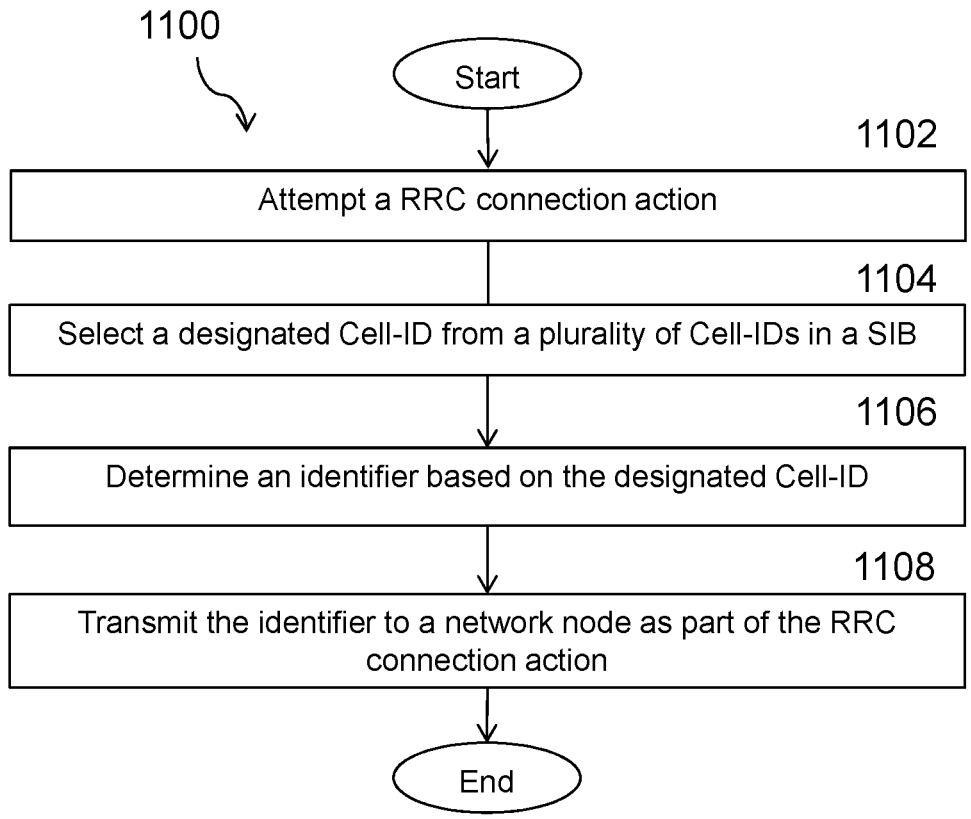
FIG. 13 illustrates another example method by a wireless device for Cell-ID selection, according to certain embodiments.

FIG. 13 illustrates an exemplary method 1100 by a wireless device for cell-ID selection, in accordance with certain embodiments. It is generally recognized that the steps depicted are provided as an example and may be performed in any appropriate order. Additional or fewer steps may be performed as appropriate.

The method begins at step 1102 when wireless device 110 attempts a radio resource control (RRC) connection action. At step 1104, wireless device 110 selects a designated Cell-ID from a plurality of Cell IDs in a system information block (SIB). At step 1106, wireless device 110 determines an identifier based on the designated Cell-ID. At step 1108, wireless device 110 transmits the identifier to a network node as part of the RRC connection action.

In a particular embodiment, the designated Cell-ID is a first occurring Cell-ID in the SIB and/or the Cell-ID within the plurality of Cell IDs in the SIB that is without a suffix.

In a particular embodiment, the RRC connection action comprises an RRC Connection Reestablishment. In another embodiment, the RRC connection action comprises an RRC Connection Resume.

In a particular embodiment, the designated Cell-ID comprises an extended Cell Global Identifier (ECGI).

In a particular embodiment, the identifier comprises a shortMAC-I or a shortResumeMAC-I. In a further particular embodiment, when determining the identifier based on the designated Cell-ID, wireless device 110 may compute the shortMAC-I or shortResume MAC-I based on the designated Cell-ID.

Figure 14:
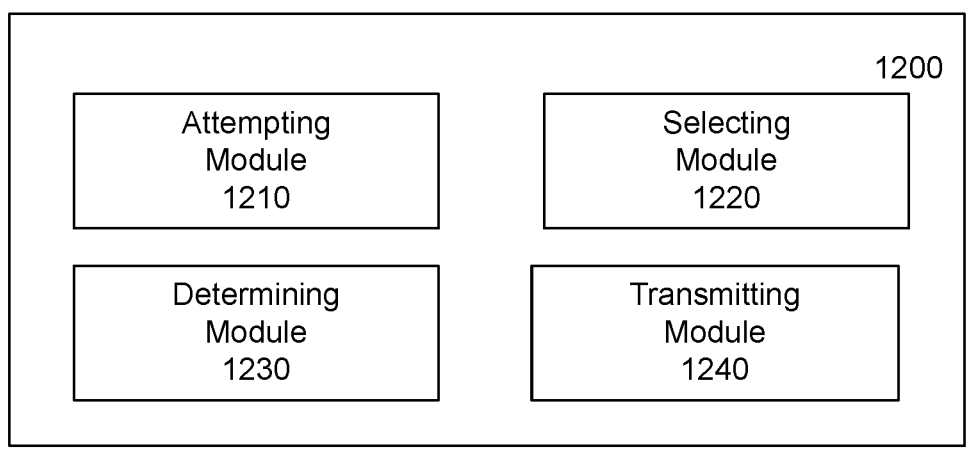
FIG. 14 illustrates an exemplary virtual computing device for Cell-ID selection, according to certain embodiments.

In certain embodiments, the method for cell-ID selection as described above may be performed by a computer networking virtual apparatus. FIG. 14 illustrates an example virtual computing device 1200 for cell-ID selection, according to certain embodiments. In certain embodiments, virtual computing device 1200 may include modules for performing steps similar to those described above with regard to the method illustrated and described in FIG. 13. For example, virtual computing device 1200 may include an attempting module 1210, a selecting module 1220, a determining module 1230, a transmitting module 1240, and any other suitable modules for cell-ID selection. In some embodiments, one or more of the modules may be implemented by processing circuitry 120 of FIG. 3. In certain embodiments, the functions of two or more of the various modules may be combined into a single module.

The attempting module 1210 may perform the attempting functions of virtual computing device 1200. For example, in a particular embodiment, attempting module 1210 may attempt a RRC connection action.

The selecting module 1220 may perform the selecting functions of virtual computing device 1200. For example, in a particular embodiment, selecting module 1220 may select a designated Cell-ID from a plurality of Cell IDs in a system information block (SIB).

The determining module 1230 may perform the determining functions of virtual computing device 1200. For example, in a particular embodiment, determining module 1230 may determine an identifier based on the designated Cell-ID.

The transmitting module 1230 may perform the transmitting functions of virtual computing device 1200. For example, in a particular embodiment, transmitting module 1230 may transmit the identifier to a network node as part of the RRC connection action.

Other embodiments of virtual computing device 1200 may include additional components beyond those shown in FIG. 14 that may be responsible for providing certain aspects of the wireless device's functionality, including any of the functionality described above and/or any additional functionality (including any functionality necessary to support the solutions described above). The various different types of wireless devices 110 may include components having the same physical hardware but configured (e.g., via programming) to support different radio access technologies, or may represent partly or entirely different physical components.

Figure 15:
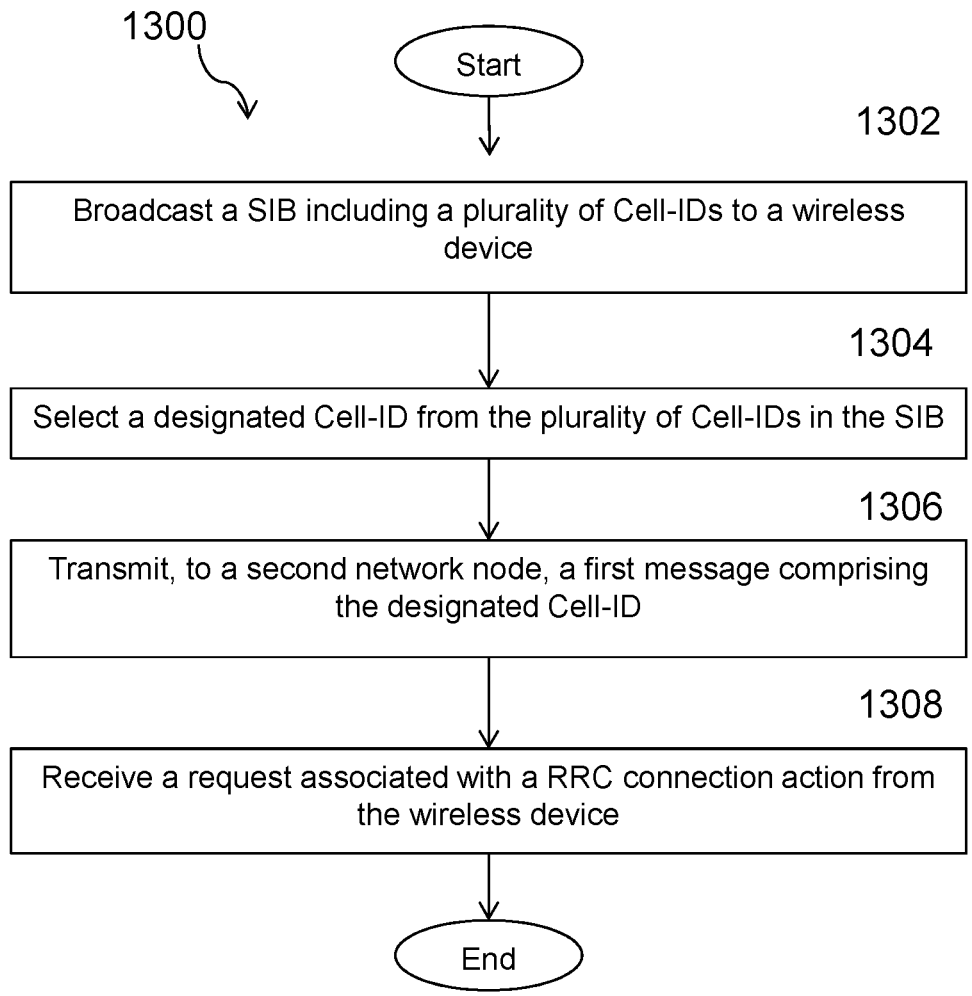
FIG. 15 illustrates an example method by a network node for Cell-ID selection, according to certain embodiments.

FIG. 15 illustrates an example method 1300 by a network node 160 for cell-ID selection, according to certain embodiments. The method begins at step 1302 when network node 160 broadcasts a SIB including a plurality of Cell-IDs to a wireless device 110. At step 1304, network node 160 selects a designated Cell-ID from the plurality of Cell-IDs in the SIB. At step 1306, network node 160 transmits, to a second network node 160, a first message comprising the designated Cell-ID. At step 1308, network node 160 receives a request associated with a RRC connection action from the wireless device 110.

In a particular embodiment, the RRC connection action comprises a RRC Connection Reestablishment or a RRC Connection Resume.

In a particular embodiment, the first network node is operating as a target network node with respect to a wireless device and the second network node is operating as a source network node with respect to a wireless device.

In a particular embodiment, the first network node is operating as a new network node with respect to a wireless device and the second network node is operating as an old network node with respect to a wireless device.

In a particular embodiment, the designated Cell-ID is a first occurring Cell-ID in the SIB and/or a Cell-ID within the plurality of Cell IDs in the SIB that is without a suffix.

Figure 16:
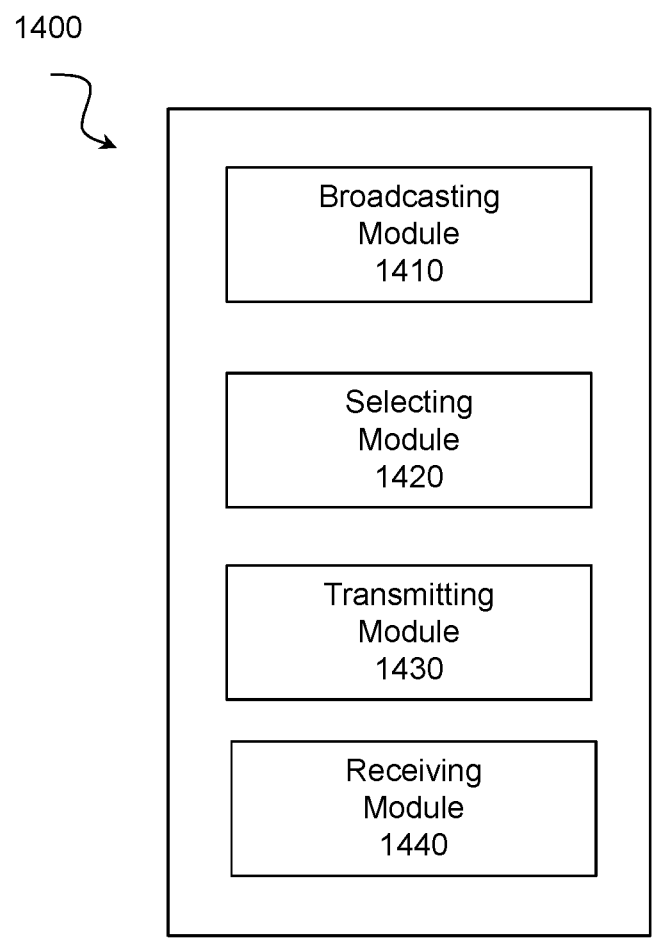
FIG. 16 illustrates another exemplary virtual computing device for Cell-ID selection, according to certain embodiments.

In a particular embodiment, the method for cell-ID selection as described above may be performed by a computer networking virtual apparatus. FIG. 16 illustrates an example virtual computing device 1400 for cell-ID selection, according to certain embodiments. In certain embodiments, virtual computing device 1400 may include modules for performing steps similar to those described above with regard to the method illustrated and described in FIG. 15. For example, virtual computing device 1400 may include at least one broadcasting module 1410, a selecting module 1420, a transmitting module 1430, a receiving module 1440, and any other suitable modules for cell-ID selection. In some embodiments, one or more of the modules may be implemented using processing circuitry 170 of FIG. 2. In certain embodiments, the functions of two or more of the various modules may be combined into a single module.

The broadcasting module 1410 may perform the broadcasting functions of virtual computing device 1400. For example, in a particular embodiment, broadcasting module 1410 may broadcast a SIB including a plurality of Cell-IDs to a wireless device 110.

The selecting module 1420 may perform the selecting functions of virtual computing device 1400. For example, in a particular embodiment, selecting module 1420 may select a designated Cell-ID from a plurality of Cell-IDs in a SIB.

The transmitting module 1430 may perform the transmitting functions of virtual computing device 1400. For example, in a particular embodiment, transmitting module 1430 may transmit, to a second network node, a first message comprising the designated Cell-ID.

The receiving module 1440 may perform the receiving functions of virtual computing device 1400. For example, in a particular embodiment, receiving module 1440 may receive a request associated with a RRC connection action from the wireless device 110.

Other embodiments of virtual computing device 1400 may include additional components beyond those shown in FIG. 16 that may be responsible for providing certain aspects of the network node's 160 functionality, including any of the functionality described above and/or any additional functionality (including any functionality necessary to support the solutions described above). The various different types of network nodes 160 may include components having the same physical hardware but configured (e.g., via programming) to support different radio access technologies, or may represent partly or entirely different physical components.

The term unit or module may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

EXAMPLE EMBODIMENTS

Embodiment A1. A method performed by a wireless device for cell ID selection, the method comprising:
  Attempting an RRC connection action;
  Determining a shortMAC-I or shortResumeMAC-I that comprises a Cell-ID; and
  Transmitting the shortMAC-I or shortResumeMAC-I to a network node as part of the RRC connection action.

Embodiment A2. The method of Embodiment A1 wherein the RRC connection action comprises RRC Connection Reestablishment.

Embodiment A3. The method of Embodiment A1 wherein the RRC connection action comprises RRC Connection Resume.

Embodiment A4. The method of Embodiments A1 to A3 wherein the Cell-ID comprises a designated ID Embodiment A5. The method of Embodiments A1 to A3 further comprising selecting a PLMN, wherein the Cell-ID comprises a Cell-ID or ECGI associated with the selected PLMN.

Embodiment B1. A method performed by a base station for cell ID selection, the method comprising:
  Receiving a first message comprising a Cell-ID; and
  Attempting RRC connection action using the Cell-ID.

Embodiment B2. The method of B1 wherein the first message comprises a shortMAC-I with the Cell-ID.

Embodiment B3. The method of Embodiment B1 wherein the first message comprises a shortResumeMAC-I with the Cell-ID.

Embodiment B4. The method of Embodiments B1-B3 wherein the RRC connection action comprises RRC Connection Reestablishment.

Embodiment B5. The method of Embodiments B1-B3 wherein the RRC connection action comprises RRC Connection Resume.

Embodiment B6. The method of Embodiments B1-B4 further comprising identifying one or more IDs associated with the Cell-ID Embodiment B7. The method of Embodiments B1-B6 wherein the first message comprises a plurality of Cell-IDs.

Embodiment C1. A wireless device for cell ID selection, the wireless device comprising:
  processing circuitry configured to perform any of the steps of any of the Group A embodiments; and
  power supply circuitry configured to supply power to the wireless device.

Embodiment C2. A base station for cell ID selection, the base station comprising:
processing circuitry configured to perform any of the steps of any of the Group B embodiments;
power supply circuitry configured to supply power to the wireless device.

Embodiment C3. A user equipment (UE) for cell ID selection, the UE comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of the Group A embodiments;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.

Embodiment C4. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform any of the steps of any of the Group B embodiments.

Embodiment C5. The communication system of the previous embodiment further including the base station.

Embodiment C6. The communication system of the previous 2 embodiments, further including the UE, wherein the UE is configured to communicate with the base station.

Embodiment C7. The communication system of the previous 3 embodiments, wherein:
the processing circuitry of the host computer is configured to execute a host application, thereby providing the user data; and
the UE comprises processing circuitry configured to execute a client application associated with the host application.

Embodiment C8. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs any of the steps of any of the Group B embodiments.

Embodiment C9. The method of the previous embodiment, further comprising, at the base station, transmitting the user data.

Embodiment C10. The method of the previous 2 embodiments, wherein the user data is provided at the host computer by executing a host application, the method further comprising, at the UE, executing a client application associated with the host application.

Additional Information Relating to Clarification on Cellidentity for Shortmac-I

The eNB may provide multiple cell IDs in multi-PLMN scenarios.

During the RRC connection reestablishment procedure and RRC connection resume procedure, the UE considers the cell ID when calculating the shortMAC-I, and the target eNB (i.e. the eNB towards which the RRC connection reestablishment or resume procedure is attempted) indicates the cell ID to the source eNB (i.e. the eNB which the UE was connected to before the RRC connection failed/was suspended). The network and UE must consider the same cell ID in order for the reestablishment-/resume-procedure to succeed.

Hence the UE shall select the first cell ID in SIB1, i.e. the one indicated in the field cellIdentity (without suffix).

It is clarified that the UE shall consider the first cell ID in SIB1, i.e. the one indicated in the field cellIdentity (without suffix). Otherwise, RRC Connection re-establishment and RRC connect resume may fail in case multiple Cell IDs are provided 7.1 UE Variables
[Omitting Unchanged Parts]
—VarShortMAC-Input The UE variable VarShortMAC-Input specifies the input used to generate the shortMAC-I.
VarShortMAC-Input UE variable

```
-- ASN1START
VarShortMAC-Input ::=         SEQUENCE {
    cellIdentity              CellIdentity,
    physCellId                PhysCellId,
    c-RNTI                    C-RNTI
}
-- ASN1STOP
```

| VarShortMAC-Input field descriptions |
| --- |
| cellIdentity<br>Set to CellIdentity included in cellIdentity (without suffix) in SIB1 of the current cell.<br>c-RNTI<br>Set to C-RNTI that the UE had in the PCell it was connected to prior to the failure.<br>phys CellId<br>Set to the physical cell identity of the PCell the UE was connected to prior to the failure. |

Abbreviations

At least some of the following abbreviations may be used in this disclosure. If there is an inconsistency between abbreviations, preference should be given to how it is used above. If listed multiple times below, the first listing should be preferred over any subsequent listing(s).

1xRTT CDMA2000 1x Radio Transmission Technology
3GPP 3$^{rd}$ Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response CP Cyclic Prefix
CPICH Common Pilot Channel
CPICH Ec/No
CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method performed by a wireless device for cell identifier (Cell-ID) selection, the method comprising:
attempting a radio resource control (RRC) connection action;
selecting a designated Cell-ID from a plurality of Cell IDs in a system information block (SIB), wherein each Cell ID from the plurality of Cell IDs is associated with the same cell;
determining an indication based on the designated Cell-ID; and
transmitting the indication to a network node as part of the RRC connection action;
wherein the indication comprises a short Message Authentication Code-Integrity (shortMAC-I) or a short resume Message Authentication Code-Integrity (shortResumeMAC-I).

2. The method of claim 1, wherein the designated Cell-ID is a Cell-ID within the plurality of Cell IDs in the SIB that is without a suffix.

3. The method of claim 1, wherein the RRC connection action comprises an RRC Connection Reestablishment or wherein the RRC connection action comprises an RRC Connection Resume.

4. The method of claim 1, wherein the designated Cell-ID comprises an extended Cell Global Identifier (ECGI).

5. The method of claim 1, wherein determining the indication comprises computing the shortMAC-I or shortResumeMAC-I based on the designated Cell-ID.

6. The method of claim 1, wherein the designated Cell-ID is a first occurring Cell-ID in the SIB.

7. A wireless device for cell identifier (Cell-ID) selection, the wireless device comprising:
  processing circuitry configured to:
    attempt a radio resource control (RRC) connection action;
    select a designated Cell-ID from a plurality of Cell IDs in a system information block (SIB), wherein each Cell ID from the plurality of Cell IDs is associated with the same cell;
    determine an indication based on the designated Cell-ID; and
    transmit the indication to a network node as part of the RRC connection action;
    wherein the indication comprises a short Message Authentication Code-Integrity (shortMAC-I) or a short resume Message Authentication Code-Integrity (shortResumeMAC-I).

8. The wireless device of claim 7, wherein the designated Cell-ID is a Cell-ID within the plurality of Cell IDs in the SIB that is without a suffix.

9. The wireless device of claim 7, wherein the RRC connection action comprises an RRC Connection Reestablishment or wherein the RRC connection action comprises an RRC Connection Resume.

10. The wireless device of claim 7, wherein the designated Cell-ID comprises an extended Cell Global Identifier (ECGI).

11. The wireless device of claim 7, wherein when determining the indication the processing circuitry is configured to compute the shortMAC-I or shortResumeMAC-I based on the designated Cell-ID.

12. The wireless device of claim 7, wherein the designated Cell-ID is a first occurring Cell-ID in the SIB.

13. A method performed by a first network node for cell identifier (Cell-ID) selection, the method comprising:
  broadcasting, by the first network node, a system information block (SIB) including a plurality of Cell-IDs to a wireless device;
  selecting a designated Cell-ID from the plurality of Cell-IDs in the SIB, wherein each Cell ID from the plurality of Cell IDs is associated with the same cell;
  transmitting, to a second network node, a first message comprising the designated Cell-ID; and
  receiving a request associated with a radio resource control (RRC) connection action from the wireless device;
  wherein the request comprises a short Message Authentication Code-Integrity (shortMAC-I) or a short resume Message Authentication Code-Integrity (shortResumeMAC-I).

14. The method of claim 13, wherein the RRC connection action further comprises a RRC Connection Reestablishment or wherein the RRC connection action further comprises a RRC Connection Resume.

15. The method of claim 13, wherein:
  the first network node is operating as a target network node with respect to a wireless device; and
  the second network node is operating as a source network node with respect to a wireless device.

16. The method of claim 13, wherein:
  the first network node is operating as a new network node with respect to a wireless device; and
  the second network node is operating as an old network node with respect to a wireless device.

17. The method of claim 13, wherein the designated Cell-ID is a Cell-ID within the plurality of Cell IDs in the SIB that is without a suffix.

18. The method of claim 13, wherein the designated Cell-ID is a first occurring Cell-ID in the SIB.

19. A first network node for cell identifier (Cell-ID) selection, the first network node comprising:
  processing circuitry configured to:
    broadcast a system information block (SIB) including a plurality of Cell IDs to a wireless device;
    select a designated Cell-ID from the plurality of Cell-IDs in the SIB, wherein each Cell ID from the plurality of Cell IDs is associated with the same cell;
    transmit, to a second network node, a first message comprising the designated Cell-ID; and
    receive a request associated with a radio resource control (RRC) connection action from the wireless device;
    wherein the request comprises a short Message Authentication Code-Integrity (shortMAC-I) or short resume Message Authentication Code-Integrity (shortResumeMAC-I).

20. The first network node of claim 19, wherein the RRC connection action further comprises a RRC Connection Reestablishment or wherein the RRC connection action further comprises a RRC Connection Resume.

21. The first network node of claim 20, wherein:
  the first network node is operating as a target network node with respect to a wireless device; and
  the second network node is operating as a source network node with respect to a wireless device.

22. The first network node of claim 19, wherein:
  the first network node is operating as a new network node with respect to a wireless device; and
  the second network node is operating as an old network node with respect to a wireless device.

23. The first network node of claim 19, wherein the designated Cell-ID is a Cell-ID within the plurality of Cell IDs in the SIB that is without a suffix.

24. The first network node of claim 19, wherein the designated Cell-ID is a first occurring Cell-ID in the SIB.

* * * * *